United States Patent
Zhang

(10) Patent No.: US 10,972,232 B2
(45) Date of Patent: Apr. 6, 2021

(54) RETRANSMISSION METHOD AND DEVICE

(71) Applicant: Huawei Technologies Co., Ltd., Shenzhen (CN)

(72) Inventor: Zhang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 16/403,044

(22) Filed: May 3, 2019

(65) Prior Publication Data

US 2019/0260522 A1 Aug. 22, 2019

Related U.S. Application Data

(63) Continuation of application No. PCT/CN2017/109406, filed on Nov. 3, 2017.

(30) Foreign Application Priority Data

Nov. 4, 2016 (CN) .......................... 201610965726.8

(51) Int. Cl.
*H04L 1/18* (2006.01)
*H04L 1/00* (2006.01)
*H04W 72/04* (2009.01)

(52) U.S. Cl.
CPC .............. *H04L 1/1887* (2013.01); *H04L 1/00* (2013.01); *H04L 1/0003* (2013.01); *H04L 1/1812* (2013.01); *H04L 1/1825* (2013.01); *H04L 1/1854* (2013.01); *H04L 1/1861* (2013.01);
(Continued)

(58) Field of Classification Search
None
See application file for complete search history.

(56) References Cited

U.S. PATENT DOCUMENTS

2009/0245096 A1 10/2009 Cho et al.
2011/0134813 A1 6/2011 Park et al.
(Continued)

FOREIGN PATENT DOCUMENTS

| CN | 101621365 A | 1/2010 |
|---|---|---|
| CN | 101662346 A | 3/2010 |

(Continued)

*Primary Examiner* — Saumit Shah
(74) *Attorney, Agent, or Firm* — Leydig, Voit & Mayer, Ltd.

(57) ABSTRACT

Embodiments of this application provide a retransmission method and a device. After receiving feedback information transmitted by a receiving device based on first information indicated by a retransmission mode, a transmitting device uses second information indicated by the retransmission mode to generate data, and transmits the data to the receiving device based on third information indicated by the retransmission mode. In this process, a plurality of retransmission modes are set, so that when different retransmission modes are used, the first information used for transmitting the feedback information, the second information used for generating the retransmitted data, or the third information used for transmitting the retransmitted data is different. Therefore, objectives of reducing HARQ overheads and ensuring transmission efficiency, reliability, and latency performance of a wireless communications system are achieved.

16 Claims, 8 Drawing Sheets

(52) U.S. Cl.
CPC ....... *H04L 1/1893* (2013.01); *H04W 72/0446* (2013.01)

(56) References Cited

U.S. PATENT DOCUMENTS

| | | | | |
|---|---|---|---|---|
| 2013/0028213 A1* | 1/2013 | Ko | ........................ | H04L 1/1816 |
| | | | | 370/329 |
| 2016/0128032 A1 | 5/2016 | Wang et al. | | |
| 2018/0235003 A1* | 8/2018 | Wong | .................... | H04L 5/0055 |
| 2019/0089573 A1* | 3/2019 | Larsson | ................. | H04L 27/38 |

FOREIGN PATENT DOCUMENTS

| | | |
|---|---|---|
| CN | 101795170 A | 8/2010 |
| CN | 104348576 A | 2/2015 |
| CN | 104486049 A | 4/2015 |
| EP | 2555458 A2 | 2/2013 |
| WO | 2007090357 A1 | 8/2007 |

\* cited by examiner

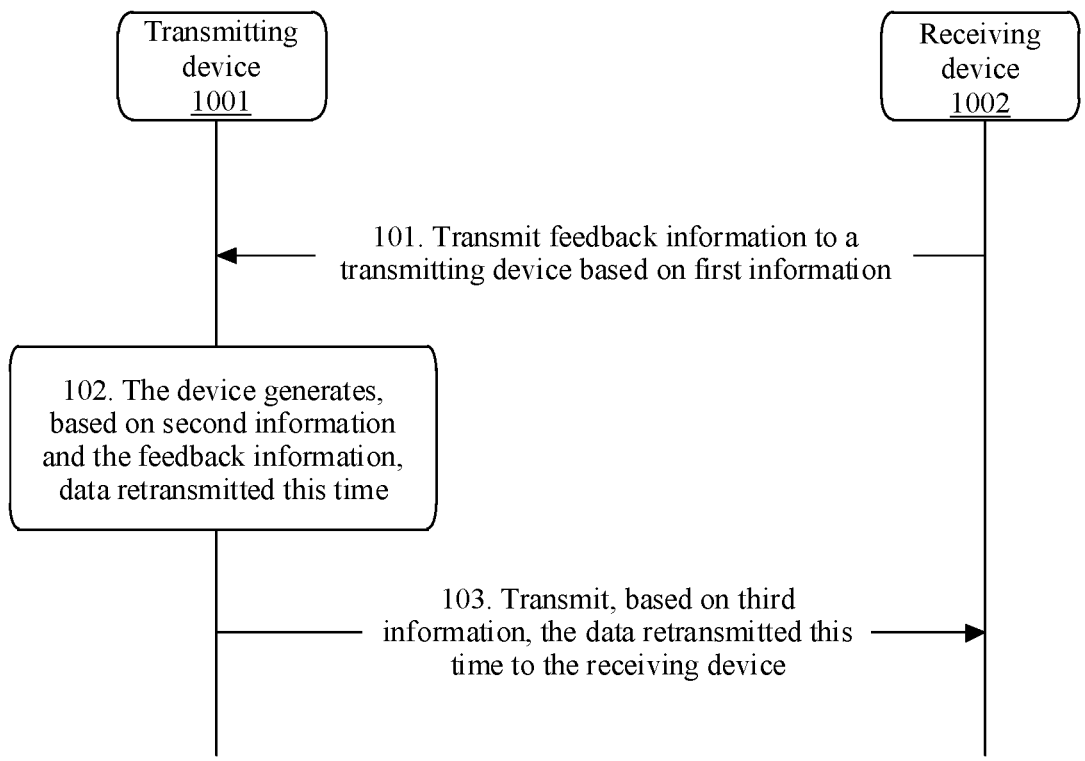
FIG. 2

RETRANSMISSION METHOD AND DEVICE

CROSS-REFERENCE TO RELATED APPLICATIONS

This application is a continuation of International Application No. PCT/CN2017/109406, filed on Nov. 3, 2017, which claims priority to Chinese Patent Application No. 201610965726.8, filed on Nov. 4, 2016. The disclosures of the aforementioned applications are hereby incorporated by reference in their entireties.

TECHNICAL FIELD

Embodiments of this application relate to communications technologies, and in particular, to a retransmission method and a device.

BACKGROUND

With continuous development of communications technologies and continuous evolution of wireless communications systems, service types supported by mobile communication increase continuously, and there are also increasingly high requirements on rates, reliability, and latencies of the wireless communications systems. To ensure efficiency and reliability of physical layer transmission, an adaptive modulation and coding (AMC) technology and a hybrid automatic repeat request (HARQ) technology are jointly used in a wireless communications system.

Specifically, in the AMC technology, a modulation scheme and a coding rate that can fully and effectively utilize a channel capacity are selected based on real-time channel state information to improve transmission efficiency. Because the channel state information may be inaccurate, an error exists. To ensure reliability, a HARQ mechanism is used to feed back a transmission result, so that incorrectly transmitted data is retransmitted. During retransmission, an amount of retransmitted data is the same as an amount of initially transmitted data, in other words, an amount of data retransmitted each time is the same as the amount of initially transmitted data.

For full utilization of the channel capacity, an operating point of the wireless communications system, in other words, an initial block error rate (iBLER), is relatively high, for example, is 10%. The relatively high operating point causes HARQ retransmission overheads to increase, although transmission efficiency is improved. To reduce retransmission overheads, a transmitting device in the wireless communications system uses a relatively fixed amount of retransmitted data (referred to as a granularity of retransmission or a length of the retransmitted data) at each time of retransmission based on a feedback of a receiving device. The granularity of retransmission is less than an amount of initially transmitted data (referred to as a granularity of initial transmission or a length of the initially transmitted data), and therefore unnecessary overheads are reduced.

However, in the process of reducing HARQ overheads, the receiving device needs to provide the feedback, causing feedback overheads to increase. In comparison with a retransmission mode in which an amount of retransmitted data is the same as an amount of initially transmitted data, when reliability is the same, a retransmission mode with a relatively small fixed amount of retransmitted data has more overheads and a higher latency. Therefore, how to ensure transmission efficiency, reliability, and latency performance of the wireless communications system while reducing the HARQ overheads is indeed a problem to be resolved in the industry.

SUMMARY

Embodiments of this application provide a retransmission method and a device, where a plurality of retransmission modes are set, and a transmitting device performs retransmission based on the retransmission modes, thereby achieving objectives of reducing HARQ overheads and ensuring transmission efficiency, reliability, and latency performance of a wireless communications system.

According to a first aspect, an embodiment of this application provides a retransmission method, where the method is described from a perspective of a transmitting device. The method includes: after receiving feedback information transmitted by a receiving device based on first information indicated by a retransmission mode, using, by a transmitting device, second information indicated by the retransmission mode to generate data retransmitted this time, and transmitting the data to the receiving device based on third information indicated by the retransmission mode. A set of the first information, the second information, and the third information is defined as a retransmission mode. When at least one of the first information, the second information, and the third information used at two times of retransmission is different, different retransmission modes are defined.

In the foregoing embodiment, a plurality of retransmission modes are set, so that when different retransmission modes are used, the first information used for transmitting the feedback information, the second information used for generating the retransmitted data, or the third information used for transmitting the retransmitted data is different. Therefore, objectives of reducing HARQ overheads and ensuring transmission efficiency, reliability, and latency performance of a wireless communications system are achieved.

In a feasible implementation, the first information indicates at least one of the following information: a time-frequency resource occupied by the feedback information or a format of the feedback information, where the format of the feedback information includes at least one of a bit sequence length of the feedback information, a meaning of the feedback information, or a modulation and coding scheme corresponding to the feedback information; the second information indicates at least one of the following information: information about a start position or information about a length of the data retransmitted this time; and the third information indicates at least one of the following information: a time-frequency resource occupied by the data retransmitted this time, a modulation and coding scheme, a puncturing rule, or a repetition mode.

In the foregoing method, the first information, the second information, and the third information are configured flexibly.

In a feasible implementation, the time-frequency resource occupied by the feedback information is determined by the receiving device based on a first mapping relationship included in the first information, where the first mapping relationship is a mapping relationship between the time-frequency resource occupied by the feedback information and fourth information, and the fourth information includes at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, or a slot for retransmission.

In the foregoing method, an objective of determining the time-frequency resource occupied by the feedback information is achieved.

In a feasible implementation, the format of the feedback information is determined by the receiving device based on a second mapping relationship included in the first information, where the second mapping relationship is a mapping relationship between the format of the feedback information and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission.

In the foregoing method, an objective of determining the format of the feedback information is achieved.

In a feasible implementation, when the start position of the data retransmitted this time is determined, only the second information is considered, and in this case, the generating, by the transmitting device based on second information and the feedback information, data retransmitted this time includes: when the feedback information indicates that previous retransmission fails, determining, by the transmitting device, the start position based on a third mapping relationship included in the second information, where the third mapping relationship is a mapping relationship between the start position and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; and generating, by the transmitting device based on the start position, the data retransmitted this time; or when the start position of the data retransmitted this time is determined, not only the second information but also the feedback information is considered, and in this case, the generating, by the transmitting device based on second information and the feedback information, data retransmitted this time includes: when the feedback information indicates that previous retransmission fails, determining, by the transmitting device, the start position based on a fourth mapping relationship included in the second information, where the fourth mapping relationship is a mapping relationship between the start position, the fourth information, and fifth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the fifth information is information indicating the start position in the feedback information; and generating, by the transmitting device based on the start position, the data retransmitted this time.

In the foregoing method, an objective of determining the start position of the data retransmitted this time is achieved.

In a feasible implementation, when the length of the data retransmitted this time is determined, only the second information is considered, and in this case, the generating, by the transmitting device based on second information and the feedback information, data retransmitted this time includes: when the feedback information indicates that previous retransmission fails, determining, by the transmitting device, the length based on a fifth mapping relationship included in the second information, where the fifth mapping relationship is a mapping relationship between the length and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; and generating, by the transmitting device based on the length, the data retransmitted this time; or when the length of the data retransmitted this time is determined, not only the second information but also the feedback information is considered, and in this case, the generating, by the transmitting device based on second information and the feedback information, data retransmitted this time includes: when the feedback information indicates that previous retransmission fails, determining, by the transmitting device, the length of the retransmitted data based on a sixth mapping relationship included in the second information, where the sixth mapping relationship is a mapping relationship between the length, the fourth information, and sixth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the sixth information is information indicating the length in the feedback information; and generating, by the transmitting device based on the length, the data retransmitted this time.

In the foregoing method, an objective of determining the length of the data retransmitted this time is achieved.

In a feasible implementation, when the data retransmitted this time is transmitted, the time-frequency resource occupied by the data retransmitted this time is determined based on the third information, and in this case, the transmitting, by the transmitting device based on third information, the data retransmitted this time to the receiving device includes: determining, by the transmitting device based on a seventh mapping relationship included in the third information, the time-frequency resource occupied by the data retransmitted this time; and transmitting, by the transmitting device, the data retransmitted this time to the receiving device by using the time-frequency resource occupied by the data retransmitted this time, where the seventh mapping relationship is a mapping relationship between the time-frequency resource occupied by the data retransmitted this time and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the time-frequency resource occupied by the data retransmitted this time is determined based on the third information and the feedback information, and in this case, the transmitting, by the transmitting device based on third information, the data retransmitted this time to the receiving device includes: determining, by the transmitting device based on an eighth mapping relationship included in the third information, the time-frequency resource occupied by the data retransmitted this time; and transmitting, by the transmitting device, the data retransmitted this time to the receiving device by using the time-frequency resource occupied by the data retransmitted this time, where the eighth mapping relationship is a mapping relationship between the time-frequency resource occupied by the data retransmitted this time, the fourth information, and seventh information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the seventh information is information indicating the time-frequency resource occupied by the data retransmitted this time, in the feedback information.

In the foregoing method, an objective of determining the time-frequency resource occupied by the data retransmitted this time is achieved.

In a feasible implementation, when the data retransmitted this time is transmitted, the repetition mode of the data retransmitted this time is determined based on the third information, and in this case, the transmitting, by the transmitting device based on the third information, the data retransmitted this time to the receiving device includes: determining, by the transmitting device, the repetition mode based on a ninth mapping relationship included in the third information; and transmitting, by the transmitting device, the data retransmitted this time to the receiving device based on the repetition mode, where the ninth mapping relationship is a mapping relationship between the repetition mode and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the repetition mode of the data retransmitted this time is determined based on the third information and the feedback information, and in this case, the transmitting, by the transmitting device based on the third information, the data retransmitted this time to the receiving device includes: determining, by the transmitting device, the repetition mode based on a tenth mapping relationship included in the third information; and transmitting, by the transmitting device, the data retransmitted this time to the receiving device based on the repetition mode, where the tenth mapping relationship is a mapping relationship between the repetition mode, the fourth information, and eighth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the eighth information is information indicating the repetition mode of the data retransmitted this time, in the feedback information.

In a feasible implementation, at least one of the first information, the second information, and the third information is preconfigured; or at least one of the first information, the second information, and the third information is obtained through signaling interaction between the transmitting device and the receiving device; or at least one of the first information, the second information, and the third information is indicated by the receiving device to the transmitting device; or the transmitting device determines at least one of actual first information, actual second information, and actual third information, and indicates the at least one of the actual first information, the actual second information, and the actual third information to the receiving device.

In the foregoing method, an objective of flexibly configuring the first information, the second information, and the third information when retransmission is performed between the transmitting device and the receiving device is achieved.

According to a second aspect, an embodiment of this application provides a retransmission method, where the method is described from a perspective of a receiving device, and the method includes: transmitting, by a receiving device, feedback information to a transmitting device based on first information indicated by a retransmission mode; and after receiving the feedback information transmitted by the receiving device based on the first information indicated by the retransmission mode, using, by the transmitting device, second information indicated by the retransmission mode to generate data retransmitted this time, and transmitting the data to the receiving device based on third information indicated by the retransmission mode. A set of the first information, the second information, and the third information is defined as a retransmission mode. When at least one of the first information, the second information, and the third information used at two times of retransmission is different, different retransmission modes are defined.

In the foregoing method, a plurality of retransmission modes are set, so that when different retransmission modes are used, the first information used for transmitting the feedback information, the second information used for generating the retransmitted data, or the third information used for transmitting the retransmitted data is different. Therefore, objectives of reducing HARQ overheads and ensuring transmission efficiency, reliability, and latency performance of a wireless communications system are achieved.

In a feasible implementation, the first information indicates at least one of the following information: a time-frequency resource occupied by the feedback information or a format of the feedback information, where the format of the feedback information includes at least one of a bit sequence length of the feedback information, a meaning of the feedback information, or a modulation and coding scheme corresponding to the feedback information; the second information indicates at least one of the following information: a start position or a length of the data retransmitted this time; and the third information indicates at least one of the following information: a time-frequency resource occupied by the data retransmitted this time, a modulation and coding scheme, a puncturing rule, or a repetition mode.

In a feasible implementation, the transmitting, by a receiving device, feedback information to a transmitting device based on first information includes: determining, by the receiving device based on a first mapping relationship included in the first information, the time-frequency resource occupied by the feedback information; and transmitting, by the receiving device, the feedback information to the transmitting device by using the time-frequency resource occupied by the feedback information, where the first mapping relationship is a mapping relationship between the time-frequency resource occupied by the feedback information and fourth information, and the fourth information includes at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, or a slot for retransmission.

In a feasible implementation, the transmitting, by a receiving device, feedback information to a transmitting device based on first information includes: determining, by the receiving device, the format of the feedback information based on a second mapping relationship included in the first information; and transmitting, by the receiving device, the feedback information to the transmitting device based on the format of the feedback information, where the second mapping relationship is a mapping relationship between the format of the feedback information and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission.

In a feasible implementation, the start position of the data retransmitted this time is determined by the transmitting device based on a third mapping relationship included in the second information, and the data retransmitted this time is generated by the transmitting device based on the start position and the feedback information, where the third mapping relationship is a mapping relationship between the start position and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; or the start position of the data retransmitted this time is determined by the transmitting device based on a fourth mapping relationship included in the second information, and the data retransmitted this time is generated by the transmitting device based on the start position and the feedback information, where the fourth mapping relationship is a mapping relationship between the start position, the fourth information, and fifth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the fifth information is information indicating the start position in the feedback information.

In a feasible implementation, the length of the data retransmitted this time is determined by the transmitting device based on a fifth mapping relationship included in the second information, and the data retransmitted this time is generated by the transmitting device based on the length and the feedback information, where the fifth mapping relationship is a mapping relationship between the length and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; or the length of the data retransmitted this time is determined by the transmitting device based on a sixth mapping relationship included in the second information, and the data retransmitted this time is generated by the transmitting device based on the length and the feedback information, where the sixth mapping relationship is a mapping relationship between the length, the fourth information, and sixth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the sixth information is information indicating the length in the feedback information.

In a feasible implementation, the time-frequency resource occupied by the data retransmitted this time is determined by the transmitting device based on a seventh mapping relationship included in the third information, and the data retransmitted this time is transmitted by the transmitting device by using the time-frequency resource occupied by the retransmitted data, where the seventh mapping relationship is a mapping relationship between the time-frequency resource occupied by the retransmitted data and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the time-frequency resource occupied by the data retransmitted this time is determined by the transmitting device based on an eighth mapping relationship included in the third information, and the data retransmitted this time is transmitted by the transmitting device by using the time-frequency resource occupied by the retransmitted data, where the eighth mapping relationship is a mapping relationship between the time-frequency resource occupied by the data retransmitted this time, the fourth information, and seventh information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the seventh information is information indicating the time-frequency resource occupied by the data retransmitted this time, in the feedback information.

In a feasible implementation, the repetition mode of the data retransmitted this time is determined by the transmitting device based on a ninth mapping relationship included in the third information, and the data retransmitted this time is transmitted by the transmitting device based on the repetition mode, where the ninth mapping relationship is a mapping relationship between the repetition mode and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the repetition mode of the data retransmitted this time is determined by the transmitting device based on a tenth mapping relationship included in the third information, and the data retransmitted this time is transmitted by the transmitting device based on the repetition mode, where the tenth mapping relationship is a mapping relationship between the repetition mode, the fourth information, and eighth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the eighth information is information indicating the repetition mode of the data retransmitted this time, in the feedback information.

In a feasible implementation, at least one of the first information, the second information, and the third information is preconfigured; or at least one of the first information, the second information, and the third information is obtained through signaling interaction between the transmitting device and the receiving device; or at least one of the first information, the second information, and the third information is indicated by the receiving device to the transmitting device; or the transmitting device determines at least one of actual first information, actual second information, and actual third information, and indicates the at least one of the actual first information, the actual second information, and the actual third information to the receiving device.

According to a third aspect, an embodiment of this application provides a transmitting device, including:

a receiving module, configured to receive feedback information transmitted by a receiving device, where the feedback information is transmitted by the receiving device based on first information;

a processing module, configured to generate, based on second information and the feedback information, data retransmitted this time; and a transmitting module, configured to transmit, based on third information, the data retransmitted this time to the receiving device.

In a feasible implementation, the first information indicates at least one of the following information: a time-frequency resource occupied by the feedback information or a format of the feedback information, where the format of the feedback information includes at least one of a bit sequence length of the feedback information, a meaning of the feedback information, or a modulation and coding scheme corresponding to the feedback information; the second information indicates at least one of the following information: information about a start position or information about a length of the data retransmitted this time; and the third information indicates at least one of the following information: a time-frequency resource occupied by the data retransmitted this time, a modulation and coding scheme, a puncturing rule, or a repetition mode.

In a feasible implementation, the time-frequency resource occupied by the feedback information is determined by the receiving device based on a first mapping relationship included in the first information, where the first mapping relationship is a mapping relationship between the time-frequency resource occupied by the feedback information and fourth information, and the fourth information includes at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, or a slot for retransmission.

In a feasible implementation, the format of the feedback information is determined by the receiving device based on a second mapping relationship included in the first information, where the second mapping relationship is a mapping relationship between the format of the feedback information and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission.

In a feasible implementation, the processing module is specifically configured to: when the feedback information indicates that previous retransmission fails, determine the start position based on a third mapping relationship included in the second information, where the third mapping relationship is a mapping relationship between the start position and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; and generate, based on the start position, the data retransmitted this time; or the processing module is specifically configured to: when the feedback information indicates that previous retransmission fails, determine the start position based on a fourth mapping relationship included in the second information, where the fourth mapping relationship is a mapping relationship between the start position, the fourth information, and fifth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the fifth information is information indicating the start position in the feedback information; and generate, based on the start position, the data retransmitted this time.

In a feasible implementation, the processing module is specifically configured to: when the feedback information indicates that previous retransmission fails, determine the length based on a fifth mapping relationship included in the second information, where the fifth mapping relationship is a mapping relationship between the length and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; and generate, based on the length, the data retransmitted this time; or the processing module is specifically configured to: when the feedback information indicates that previous retransmission fails, determine the length of the retransmitted data based on a sixth mapping relationship included in the second information, where the sixth mapping relationship is a mapping relationship between the length, the fourth information, and sixth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the sixth information is information indicating the length in the feedback information; and generate, based on the length, the data retransmitted this time.

In a feasible implementation, the transmitting module is specifically configured to determine, based on a seventh mapping relationship included in the third information, the time-frequency resource occupied by the data retransmitted this time; and transmit the data retransmitted this time to the receiving device by using the time-frequency resource occupied by the data retransmitted this time, where the seventh mapping relationship is a mapping relationship between the time-frequency resource occupied by the data retransmitted this time and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the transmitting module is specifically configured to determine, based on an eighth mapping relationship included in the third information, the time-frequency resource occupied by the data retransmitted this time; and transmit the data retransmitted this time to the receiving device by using the time-frequency resource occupied by the data retransmitted this time, where the eighth mapping relationship is a mapping relationship between the time-frequency resource occupied by the data retransmitted this time, the fourth information, and seventh information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the seventh information is information indicating the time-frequency resource occupied by the data retransmitted this time, in the feedback information.

In a feasible implementation, the transmitting module is specifically configured to determine the repetition mode based on a ninth mapping relationship included in the third information; and transmit the data retransmitted this time to the receiving device based on the repetition mode, where the ninth mapping relationship is a mapping relationship between the repetition mode and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the transmitting module is specifically configured to determine the repetition mode based on a tenth mapping relationship included in the third information; and transmit the data retransmitted this time to the receiving device based on the repetition mode, where the tenth mapping relationship is a mapping relationship between the repetition mode, the fourth information, and eighth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the eighth information is information indicating the repetition mode of the data retransmitted this time, in the feedback information.

In a feasible implementation, at least one of the first information, the second information, and the third information is preconfigured; or at least one of the first information, the second information, and the third information is obtained through signaling interaction between the transmitting device and the receiving device; or at least one of the first information, the second information, and the third information is indicated by the receiving device to the transmitting device; or the transmitting device determines at least one of actual first information, actual second information, and actual third information, and indicates the at least one of the actual first information, the actual second information, and the actual third information to the receiving device.

According to a fourth aspect, an embodiment of this application provides a receiving device, including:

a transmitting module, configured to transmit feedback information to a transmitting device based on first information; and a receiving module, configured to receive data retransmitted this time, where the data retransmitted this time is transmitted by the transmitting device based on third information, where the data retransmitted this time is generated by the transmitting device based on second information and the feedback information.

In a feasible implementation, the first information indicates at least one of the following information: a time-frequency resource occupied by the feedback information or a format of the feedback information, where the format of the feedback information includes at least one of a bit sequence length of the feedback information, a meaning of the feedback information, or a modulation and coding scheme corresponding to the feedback information;

the second information indicates at least one of the following information: a start position or a length of the data retransmitted this time; and the third information indicates at least one of the following information: a time-frequency resource occupied by the data retransmitted this time, a modulation and coding scheme, a puncturing rule, or a repetition mode.

In a feasible implementation, the receiving module is specifically configured to determine, based on a first mapping relationship included in the first information, the time-frequency resource occupied by the feedback information; and the transmitting module is configured to transmit the feedback information to the transmitting device by using the time-frequency resource occupied by the feedback information, where the first mapping relationship is a mapping relationship between the time-frequency resource occupied by the feedback information and fourth information, and the fourth information includes at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, or a slot for retransmission.

In a feasible implementation, the receiving module is specifically configured to determine the format of the feedback information based on a second mapping relationship included in the first information; and the transmitting module is configured to transmit the feedback information to the transmitting device based on the format of the feedback information, where the second mapping relationship is a mapping relationship between the format of the feedback information and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission.

In a feasible implementation, the start position of the data retransmitted this time is determined by the transmitting device based on a third mapping relationship included in the second information, and the data retransmitted this time is generated by the transmitting device based on the start position and the feedback information, where the third mapping relationship is a mapping relationship between the start position and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; or the start position of the data retransmitted this time is determined by the transmitting device based on a fourth mapping relationship included in the second information, and the data retransmitted this time is generated by the transmitting device based on the start position and the feedback information, where the fourth mapping relationship is a mapping relationship between the start position, the fourth information, and fifth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the fifth information is information indicating the start position in the feedback information.

In a feasible implementation, the length of the data retransmitted this time is determined by the transmitting device based on a fifth mapping relationship included in the second information, and the data retransmitted this time is generated by the transmitting device based on the length and the feedback information, where the fifth mapping relationship is a mapping relationship between the length and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; or the length of the data retransmitted this time is determined by the transmitting device based on a sixth mapping relationship included in the second information, and the data retransmitted this time is generated by the transmitting device based on the length and the feedback information, where the sixth mapping relationship is a mapping relationship between the length, the fourth information, and sixth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the sixth information is information indicating the length in the feedback information.

In a feasible implementation, the time-frequency resource occupied by the data retransmitted this time is determined by the transmitting device based on a seventh mapping relationship included in the third information, and the data retransmitted this time is transmitted by the transmitting device by using the time-frequency resource occupied by the retransmitted data, where the seventh mapping relationship is a mapping relationship between the time-frequency resource occupied by the retransmitted data and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the time-frequency resource occupied by the data retransmitted this time is determined by the transmitting device based on an eighth mapping relationship included in the third information, and the data retransmitted this time is transmitted by the transmitting device by using the time-frequency resource occupied by the retransmitted data, where the eighth mapping relationship is a mapping relationship between the time-frequency resource occupied by the data retransmitted this time, the fourth information, and seventh information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the seventh information is information indicating the time-frequency resource occupied by the data retransmitted this time, in the feedback information.

In a feasible implementation, the repetition mode of the data retransmitted this time is determined by the transmitting device based on a ninth mapping relationship included in the third information, and the data retransmitted this time is transmitted by the transmitting device based on the repetition mode, where the ninth mapping relationship is a mapping relationship between the repetition mode and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the repetition mode of the data retransmitted this time is determined by the transmitting device based on a tenth mapping relationship included in the third information, and the data retransmitted this time is transmitted by the transmitting device based on the repetition mode, where the tenth mapping relationship is a mapping relationship between the repetition mode, the fourth information, and eighth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the eighth information is information indicating the repetition mode of the data retransmitted this time, in the feedback information.

In a feasible implementation, at least one of the first information, the second information, and the third information is preconfigured; or at least one of the first information, the second information, and the third information is obtained through signaling interaction between the transmitting device and the receiving device; or at least one of the first information, the second information, and the third information is indicated by the receiving device to the transmitting device; or the transmitting device determines at least one of actual first information, actual second information, and actual third information, and indicates the at least one of the actual first information, the actual second information, and the actual third information to the receiving device.

According to a fifth aspect, an embodiment of this application provides a transmitting device, including a processor, a memory, a communications interface, and a system bus, where the memory and the communications interface are connected to and communicate with the processor by using the system bus, the memory is configured to store a computer-executable instruction, the communications interface is configured to communicate with another device, and the processor is configured to run the computer-executable instruction, so that the transmitting device performs each step in the first aspect or any possible implementation of the first aspect.

According to a sixth aspect, an embodiment of this application provides a receiving device, including a processor, a memory, a communications interface, and a system bus, where the memory and the communications interface are connected to and communicate with the processor by using the system bus, the memory is configured to store a computer-executable instruction, the communications interface is configured to communicate with another device, and the processor is configured to run the computer-executable instruction, so that the receiving device performs each step in the second aspect or any possible implementation of the second aspect.

According to a seventh aspect, an embodiment of this application provides a computer storage medium, configured to store a computer software instruction used by the transmitting device, where the computer software instruction is used to enable a transmitting device to perform each step in the first aspect or any possible implementation of the first aspect.

According to an eighth aspect, an embodiment of this application provides a computer storage medium, configured to store a computer software instruction used by the receiving device, where the computer software instruction is used to enable a receiving device to perform each step in the second aspect or any possible implementation of the second aspect.

According to the retransmission method and device provided by the embodiments of this application, after receiving the feedback information transmitted by the receiving device based on the first information indicated by the retransmission mode, the transmitting device uses the second information indicated by the retransmission mode to generate the data retransmitted this time, and transmits the data to the receiving device based on the third information indicated by the retransmission mode. In this process, a plurality of retransmission modes are set, so that when different retransmission modes are used, the first information used for transmitting the feedback information, the second information used for generating the retransmitted data, or the third information used for transmitting the retransmitted data is different. Therefore, objectives of reducing HARQ overheads and ensuring transmission efficiency, reliability, and latency performance of a wireless communications system are achieved.

BRIEF DESCRIPTION OF DRAWINGS

FIG. 1 is a schematic diagram of a system architecture to which a retransmission method is applicable according to embodiments of this application;

FIG. 2 is a signaling diagram of a retransmission method according to embodiments of this application;

DESCRIPTION OF EMBODIMENTS

Figure 3A:
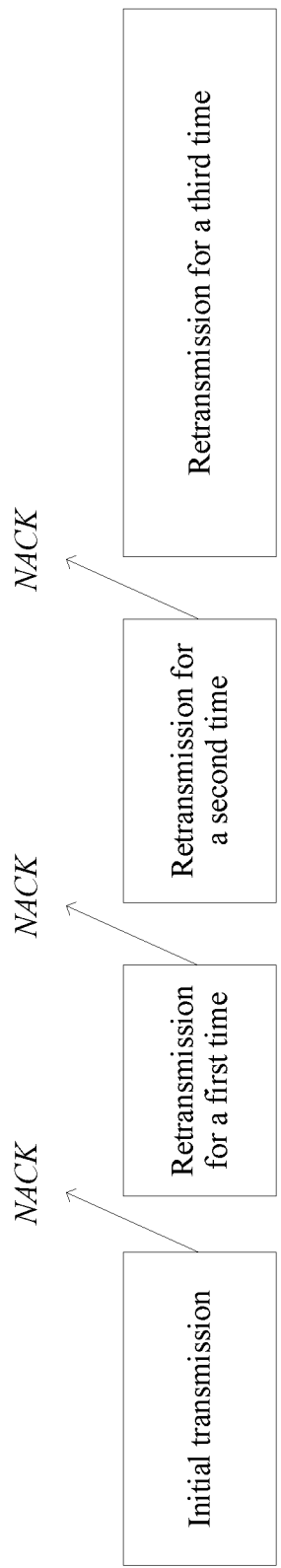
FIG. 3A is a schematic diagram of a length of data retransmitted this time in a retransmission method according to embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of this application described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Usually, in a HARQ mechanism, a transmitting device selects a modulation and coding scheme (MCS) based on initial channel state information, and generates, in a cyclic buffer based on the MCS, a plurality of pieces of retransmitted data whose lengths are the same but whose start positions are different, where the retransmitted data may also be referred to as a retransmitted bit sequence or a redundancy version (RV). After initial transmission, if a receiving device performs incorrect reception, the transmitting device selects retransmitted data from the cyclic buffer to perform retransmission, where an amount of the retransmitted data is the same as an amount of initially transmitted data, in other words, a length of the retransmitted data is the same as a length of the initially transmitted data. Because an operating point of a wireless communications system is relatively high, high HARQ retransmission overheads are caused. If a length of data retransmitted each time is the same as the length of the initially transmitted data, and the length of the initially transmitted data is relatively great, relatively high overheads are caused at each time of retransmission. To reduce retransmission overheads, the transmitting device uses a relatively fixed length of the retransmitted data at each time of retransmission, where the length of the retransmitted data is less than the length of the initially transmitted data. It is found through verification that, in comparison with a retransmission mode in which an amount of retransmitted data is the same as an amount of initially transmitted data, when reliability is the same, a retransmission mode with a relatively small fixed amount of retransmitted data has more overheads and a higher latency. Therefore, how to ensure transmission efficiency, reliability, and latency performance of the wireless communications system while reducing the HARQ overheads is indeed a problem to be urgently resolved in the industry.

In view of this, embodiments of this application provide a retransmission method and a device, where a plurality of retransmission modes are set, and a transmitting device performs retransmission based on the retransmission modes, thereby achieving objectives of reducing HARQ overheads and ensuring transmission efficiency, reliability, and latency performance of a wireless communications system.

Technologies described in the specification may be applied to various communications systems having a plurality of types of terminals, for example, a Global System for Mobile communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency Division Multiple Access (OFDMA) system, a single-carrier FDMA (SC-FDMA) system, a general packet radio service (GPRS) system, a Long Term Evolution (LTE) system, an E-UTRA system, a 5G mobile communications system, and other communications systems.

A transmitting device and a receiving device used in the embodiments of this application are relative. For example, when a network-side device is used as a transmitting device, a receiving device is user equipment. In another example, when a network-side device is used as a receiving device, a transmitting device is user equipment. In another example, in device-to-device (D2D) communication, both a transmitting device and a receiving device are user equipment. The network-side device may be a base station, an access point (AP), or the like. The base station may be a device that communicates with a wireless terminal over an air interface in an access network by using one or more sectors. The base station may be configured to mutually convert a received radio frame and an IP packet and serve as a router between the wireless terminal and a rest of the access network, where the rest of the access network may include an Internet protocol (IP) network. The base station may further coordinate attribute management of the air interface. For example, the base station may be a base station (BTS) in GSM or CDMA, or may be a base station (NodeB) in WCDMA, or may be an evolved NodeB (eNB, or e-NodeB) in LTE, or a 5G base station, and is not limited in this application. The user equipment may be a wireless terminal or a wired terminal. The wireless terminal may be a device that provides a user with voice and/or data connectivity, a handheld device with a wireless connection function, or another processing device connected to a wireless modem. The wireless terminal may communicate with one or more core networks through a radio access network (RAN) such as a 5G RAN or non-3GPP RAN. The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit (Subscriber Unit), a subscriber station (Subscriber Station), a mobile station (Mobile Station), a mobile terminal (Mobile), a remote station (Remote Station), a remote terminal (Remote Terminal), an access terminal (Access Terminal), a user terminal (User Terminal), a user agent (User Agent), a user device (User Device), or user equipment (User Equipment).

FIG. 1 is a schematic diagram of a system architecture to which a retransmission method is applicable according to embodiments of this application. Referring to FIG. 1, in the system architecture, at least one transmitting device 1001 and at least one receiving device 1002 exist, and a communication connection is established between the transmitting device 1001 and the receiving device 1002. The following describes the retransmission method in this embodiment of this application in detail on a basis of FIG. 1. For details, refer to FIG. 2.

FIG. 2 is a signaling diagram of a retransmission method according to embodiments of this application. The embodiments can include the following steps.

101. A receiving device transmits feedback information to a transmitting device based on first information.

In an embodiment of this application, a wireless communication retransmission process involves the first information used when the receiving device transmits the feedback information to the transmitting device, second information used when the transmitting device generates retransmitted data based on the feedback information, and third information used when the transmitting device transmits the retransmitted data to the receiving device. For ease of subsequent description, a set of the first information, the second information, and the third information is defined as a retransmission mode in the specification. When at least one of the first information, the second information, and the third information used at two times of retransmission is different, different retransmission modes are defined. When retransmission is performed between the transmitting device and the receiving device, after receiving data each time, the receiving device transmits feedback information to the transmitting device based on the retransmission mode by using the first information in the retransmission mode, to feed back a data receiving status. For example, if the data is received correctly, the receiving device feeds back an acknowledgement (ACK), or if the data is received incorrectly, the receiving device feeds back a negative acknowledgment (NACK). Correspondingly, the transmitting device receives the feedback information transmitted by the receiving device.

102. The transmitting device generates, based on second information and the feedback information, data retransmitted this time.

Usually, when the feedback information indicates that the receiving device performs correct reception, the data retransmitted this time does not need to be generated for retransmission. The data retransmitted this time needs to be generated for retransmission only when the feedback information indicates that the receiving device cannot perform correct reception. In this step, after receiving the feedback information indicating that the receiving device cannot perform correct reception, the transmitting device generates, based on the second information indicated by the retransmission mode and the feedback information, the data retransmitted this time.

103. The transmitting device transmits, based on third information, the data retransmitted this time to the receiving device.

After the data retransmitted this time is generated, the transmitting device transmits the data retransmitted this time to the receiving device based on the third information indicated by the retransmission mode; and correspondingly, the receiving device receives the data retransmitted this time.

In the retransmission method provided by this embodiment of this application, after receiving the feedback information transmitted by the receiving device based on the first information indicated by the retransmission mode, the transmitting device uses the second information indicated by the retransmission mode to generate the data retransmitted this time, and transmits the data to the receiving device based on the third information indicated by the retransmission mode. In this process, a plurality of retransmission modes are set, so that when different retransmission modes are used, the first information used for transmitting the feedback information, the second information used for generating the retransmitted data, or the third information used for transmitting the retransmitted data is different. Therefore, retransmission, including an amount of the retransmitted data and a physical resource used for retransmission, is configured flexibly based on quality of currently received data. This avoids retransmission of excessive unnecessary data and retransmission of insufficient data, and achieves an effect of reducing retransmission overheads and ensuring a latency and objectives of ensuring transmission efficiency, reliability, and latency performance of a wireless communications system.

In the foregoing embodiments, at least one of the first information, the second information, and the third information respectively indicated by any two different retransmission modes is different. The following describes in detail the first information, the second information, and the third information indicated by the retransmission mode.

I. First Information.

In an embodiment of this application, the first information indicates at least one of the following information: a time-frequency resource occupied by the feedback information or a format of the feedback information, where the format of the feedback information includes at least one of a bit sequence length of the feedback information, a meaning of the feedback information, or a modulation and coding scheme corresponding to the feedback information.

Specifically, the time-frequency resource includes a time domain resource and a frequency domain resource. The time domain resource indicates on which time resource the receiving device transmits the feedback information after receiving data, for example, transmits the feedback information to the transmitting device after k time units, where k may be fixed or dynamically specified by downlink control information (DCI) or the like. The frequency domain resource indicates a frequency domain position occupied by the feedback information. The frequency domain resource may be predefined. For example, in LTE, a resource in a physical hybrid automatic repeat request indicator channel (PHICH) resource pool is predefined as a frequency domain resource used by the feedback information. In another example, a resource in a physical uplink control channel (PUCCH) resource pool is predefined as a frequency domain resource used by the feedback information. In another example, a resource in a physical downlink control channel (PDCCH) resource pool is predefined as a frequency domain resource used by the feedback information. The frequency domain resource occupied by the feedback information is also discussed and defined in a 5G network. The format of the feedback information indicates the bit sequence length of the feedback information, the meaning of the feedback information, the modulation and coding scheme corresponding to the feedback information, or the like. For example, it is specified in advance that both the ACK and the NACK occupy one bit, where 0 indicates the ACK, and 1 indicates the NACK; in this case, when the receiving device receives 0 on the corresponding time-frequency resource, correct reception is considered, or when the receiving device receives 1, incorrect reception is considered. In another example, it is specified in advance that the ACK occupies one bit, and that the NACK occupies multiple bits; in this case, when the transmitting device receives multi-bit NACK feedback information, it is considered that the receiving device performs incorrect reception, or when the transmitting device receives one-bit ACK feedback information, it is considered that the receiving device performs correct reception. In another example, it is specified in advance that both the ACK and the NACK occupy multiple bits; in this case, when receiving the feedback information, the transmitting device detects feedback content based on a mapping relationship corresponding to the specific bit sequence of the feedback information. In another example, it is specified in advance that both the ACK and the NACK have two formats: M bits and N bits; in this case, the transmitting device performs detection on time-frequency resources corresponding to the two M-bit and N-bit ACK/NACK formats, and detects, based on a detection result, whether an M-bit ACK/NACK or an N-bit ACK/NACK is transmitted by the transmitting device and specific feedback content.

In a feasible implementation, the receiving device determines, based on a first mapping relationship included in the first information, the time-frequency resource occupied by the feedback information; and the receiving device transmits the feedback information to the transmitting device by using the time-frequency resource occupied by the feedback information, where the first mapping relationship is a mapping relationship between the time-frequency resource occupied by the feedback information and fourth information, and the fourth information includes at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, or a slot for retransmission.

For example, if the fourth information includes only the modulation and coding scheme for initial transmission, the first mapping relationship is a mapping relationship between the time-frequency resource occupied by the feedback information and the modulation and coding scheme for initial transmission, and the mapping relationship may be indicated by a two-dimensional table. The transmitting device knows the modulation and coding scheme for initial transmission. By querying the two-dimensional table based on the modulation and coding scheme for initial transmission, the transmitting device may determine the time-frequency resource occupied by the feedback information.

In another example, if the fourth information includes the time-frequency resource for initial transmission and the time-frequency resource for data retransmission, the first mapping relationship is a mapping relationship between the time-frequency resource occupied by the feedback information, the time-frequency resource for initial transmission, and the time-frequency resource for data retransmission, and the mapping relationship may be indicated by a three-dimensional table. The transmitting device knows the time-frequency resource for initial transmission and the time-frequency resource for data retransmission. By querying the three-dimensional table based on the time-frequency resource for initial transmission and the time-frequency resource for data retransmission, the transmitting device may determine the time-frequency resource occupied by the feedback information.

In another feasible implementation, the receiving device determines the format of the feedback information based on a second mapping relationship included in the first information; and the receiving device transmits the feedback information to the transmitting device based on the format of the feedback information, where the second mapping relationship is a mapping relationship between the format of the feedback information and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission.

II. Second Information.

In an embodiment of this application, the second information indicates at least one of the following information: a start position or a length of the retransmitted data, or the like.

Specifically, for the transmitting device, the second information is used to indicate how to fetch, from a cyclic buffer, the data retransmitted this time, including obtaining the start position or the length of the data retransmitted this time, or the like.

For example, when the start position of the data retransmitted this time is determined, only the second information is considered. In this case, if the feedback information indicates that previous retransmission fails, the transmitting device determines the start position based on a third mapping relationship included in the second information, where the third mapping relationship is a mapping relationship between the start position and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; and the transmitting device generates, based on the start position, the data retransmitted this time.

In another example, when the start position of the data retransmitted this time is determined, not only the second information but also the feedback information is considered. In this case, if the feedback information indicates that previous retransmission fails, the transmitting device determines the start position based on a fourth mapping relationship included in the second information, where the fourth mapping relationship is a mapping relationship between the start position, the fourth information and fifth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the fifth information is information indicating the start position in the feedback information.

In another example, when the length of the data retransmitted this time is determined, only the second information is considered. In this case, if the feedback information indicates that previous retransmission fails, the transmitting device determines the length based on a fifth mapping relationship included in the second information, where the fifth mapping relationship is a mapping relationship between the length and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; and the transmitting device generates, based on the length, the data retransmitted this time.

FIG. 3A is a schematic diagram of a length of data retransmitted this time in the retransmission method according to embodiments of this application.

Referring to FIG. 3A, in an embodiment, the first information is not limited, in other words, the first information used by the receiving device to transmit the NACK to the transmitting device each time is not limited. The start position of the data retransmitted this time is fixed or not fixed. The third information based on which the transmitting device transmits the data retransmitted this time to the receiving device is not limited. The fifth mapping relationship is a mapping relationship between a time-frequency resource occupied by the data retransmitted this time and relative timing information, and the relative timing information includes the quantity of times of retransmission, in other words, the length of the data retransmitted this time is determined by the quantity of times of retransmission. In this embodiment, a length of data retransmitted at a time is an amount of the data retransmitted at the time.

Usually, after receiving data, the receiving device feeds back whether the data is correctly received. Because an error occurs when an amount of initially transmitted data exceeds an actual channel capability, in most cases, the amount of the initially transmitted data does not exceed the actual channel capability greatly. To reduce unnecessary retransmission, in other words, to reduce an average amount of retransmitted data as much as possible, the transmitting device generates the retransmitted data based on the second information. In this embodiment, an amount of data retransmitted each time may be obtained based on a mapping between the amount of the initially transmitted data and a current quantity of times of retransmission. An amount of data retransmitted early for a quantity of times may be less than the amount of the initially transmitted data; and after the data is retransmitted for a quantity of times, if the receiving device still cannot perform correct reception, an amount of retransmitted data in other words subsequently retransmitted increases. In an example shown in the figure, after initial transmission, if the receiving device cannot correctly receive the data, the data needs to be retransmitted for a first time. In this case, data retransmitted this time is the data retransmitted at the first time, and an amount of the data retransmitted at the first time is less than the amount of the initially transmitted data; during retransmission for a second time, data retransmitted this time is data retransmitted at the second time, and an amount of the data retransmitted at the second time is less than the amount of the initially transmitted data; during retransmission for a third time, data retransmitted this time is data retransmitted at the third time, and an amount of the data retransmitted at the third time is greater than the amount of the initially transmitted data; and if there is retransmission for a fourth time, an amount of data retransmitted at the fourth time is greater than the amount of the initially transmitted data. It should be noted that, the foregoing example is only intended to make the description clearer, and a specific amount of data retransmitted each time may be preconfigured at random.

In another example, when the length of the data retransmitted this time is determined, not only the second information but also the feedback information is considered. In this case, if the feedback information indicates that previous retransmission fails, the transmitting device determines the length of the retransmitted data based on a sixth mapping relationship included in the second information, where the sixth mapping relationship is a mapping relationship between the length, the fourth information, and sixth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the sixth information is information indicating the length in the feedback information; and the transmitting device generates, based on the length, the data retransmitted this time.

III. Third Information.

In an embodiment of this application, the third information indicates at least one of the following information: the time-frequency resource occupied by the data retransmitted this time, a modulation and coding scheme, a puncturing rule, or a repetition mode.

Specifically, the time-frequency resource includes a time domain resource and/or a frequency domain resource. The time domain resource indicates on which time resource the transmitting device transmits the data retransmitted this time after generating the data retransmitted this time, for example, transmits the data retransmitted this time to the receiving device after k time units, where k may be fixed or dynamically specified by downlink control information (DCI) or the like. The frequency domain resource indicates a frequency domain position occupied by the data retransmitted this time. The frequency domain resource may be predefined. For example, a resource in a physical hybrid automatic repeat request indicator channel (PHICH) resource pool is predefined as a frequency domain resource used by the data retransmitted this time. In another example, a resource in a physical uplink control channel (PUCCH) resource pool is predefined as a frequency domain resource used by the data retransmitted this time. In another example, a resource in a physical downlink control channel (PDCCH) resource pool is predefined as a frequency domain resource used by the data retransmitted this time. The modulation and coding scheme (MCS) indicates a modulation order, a transport block size, and the like selected when the transmitting device transmits the retransmitted data. The puncturing rule indicates whether some bits are skipped or the like. For example, if 80-bit data is fetched, but the length of the data retransmitted this time is 60 bits, how to extract the 60-bit data from the 80-bit data is determined according to the puncturing rule. The repetition mode includes a quantity of times of transmitting the data retransmitted this time, a time-frequency resource repeatedly occupied, or the like.

For example, when a time-frequency position occupied by the data retransmitted this time is determined, only the third information is considered. In this case, the transmitting device determines, based on a seventh mapping relationship included in the third information, the time-frequency resource occupied by the data retransmitted this time; and the transmitting device transmits the data retransmitted this time to the receiving device by using the time-frequency resource occupied by the data retransmitted this time, where the seventh mapping relationship is a mapping relationship between the time-frequency resource occupied by the data retransmitted this time and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule.

Figure 3B:
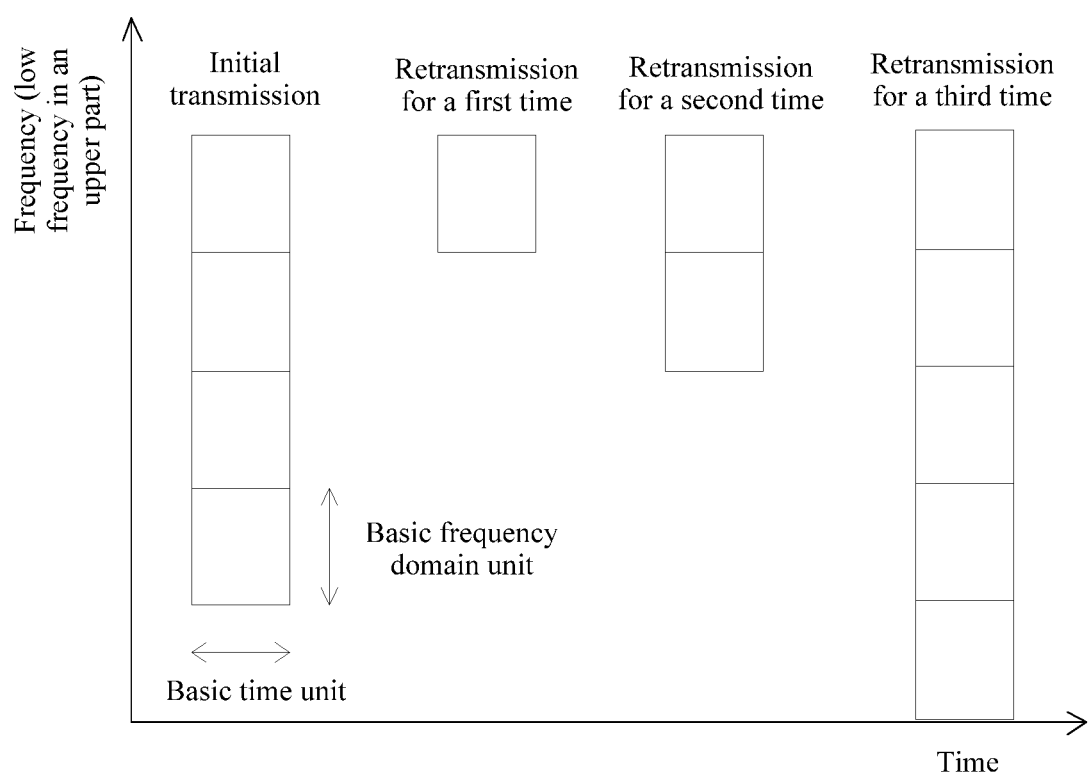
FIG. 3B is a schematic diagram of a time-frequency resource occupied by data retransmitted this time in a retransmission method according to embodiments of this application.

FIG. 3B is a schematic diagram of a time-frequency resource occupied by data retransmitted this time in the retransmission method according to embodiments of this application. After a length of the retransmitted data is determined according to the corresponding embodiment in FIG. 3A, the time-frequency resource for retransmission is determined in a manner in FIG. 3B. In an embodiment, the time domain resource for retransmission is not limited. For example, fixed retransmission timing may be used, in other words, after previous transmission fails, retransmission is performed again after K fixed time units, or the time domain resource for retransmission may be indicated by control information. Therefore, the frequency domain resource for retransmission needs to be determined. In an embodiment, the frequency domain resource occupied for retransmission may be correspondingly obtained based on a time-frequency resource for previous transmission, the length of the retransmitted data this time, and a modulation scheme for current transmission. Although a modulation scheme used in actual retransmission may be variable, for example, may be indicated by control information, it is assumed that a modulation scheme used at each time of retransmission is not changed in this embodiment. Specifically, referring to FIG. 3B, a frequency domain start point for retransmission in this embodiment, in other words, a lowest frequency occupied in frequency domain, is the same as that in previous transmission, and a quantity of occupied basic frequency domain units may be obtained based on the length of the retransmitted data. As shown in the example in the figure, the amount of the data retransmitted at the first time or the second time is less than that in initial transmission, and therefore, a quantity of occupied basic frequency domain units may be less than that in initial transmission. The amount of the data retransmitted at the third time is greater than that in initial transmission, and therefore, a quantity of occupied basic frequency domain units may be greater than that in initial transmission.

In another example, when the time-frequency resource occupied by the data retransmitted this time is determined, not only the third information but also the feedback information is considered. In this case, the transmitting device determines, based on an eighth mapping relationship included in the third information, the time-frequency resource occupied by the data retransmitted this time; and the transmitting device transmits the data retransmitted this time to the receiving device by using the time-frequency resource occupied by the data retransmitted this time, where the eighth mapping relationship is a mapping relationship between the time-frequency resource occupied by the data retransmitted this time, the fourth information, and seventh information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the seventh information is information indicating the time-frequency resource occupied by the data retransmitted this time, in the feedback information.

In another example, when the repetition mode of the data retransmitted this time is determined, only the third information is considered. In this case, the transmitting device determines the repetition mode based on a ninth mapping relationship included in the third information; and the transmitting device transmits the data retransmitted this time to the receiving device based on the repetition mode, where the ninth mapping relationship is a mapping relationship between the repetition mode and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule.

An ultra-reliable and low-latency communication (URLLC) is used as an example. URLLC is an important service in 5G and requires very high reliability and a very low latency. The reliability is as high as 99.999%, and the latency is as low as 1 ms. In a scenario in which each slot is 0.125 ms, different time resources are occupied for retransmission corresponding to different feedback times.

Figure 4A:
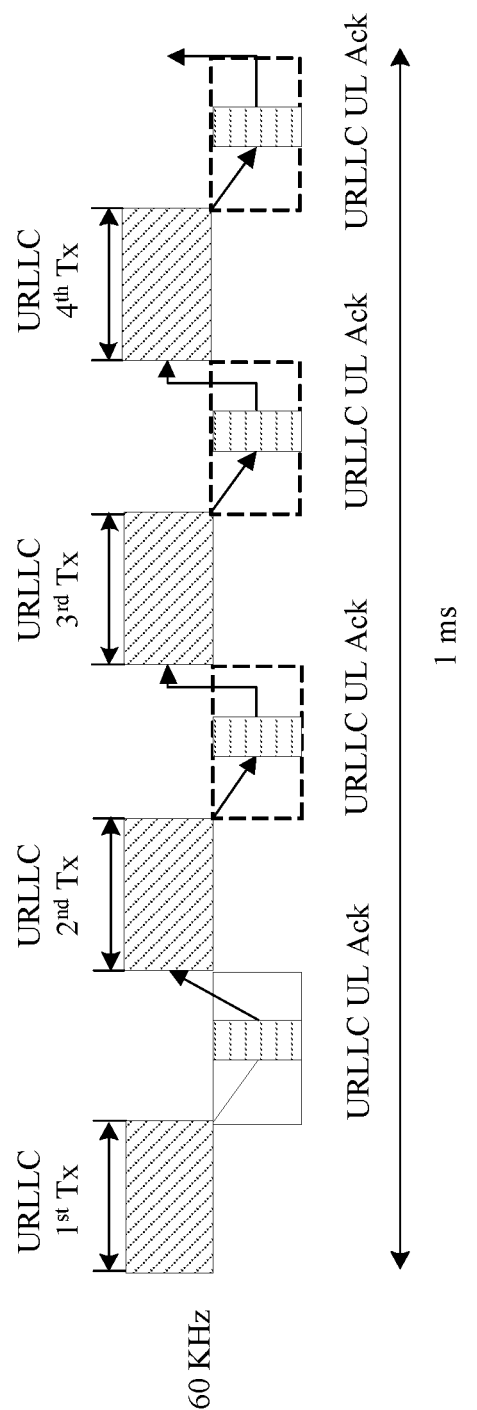
FIG. 4A is a schematic diagram of a repetition mode of data retransmitted this time in a retransmission method according to embodiments of this application.
Figure 4B:
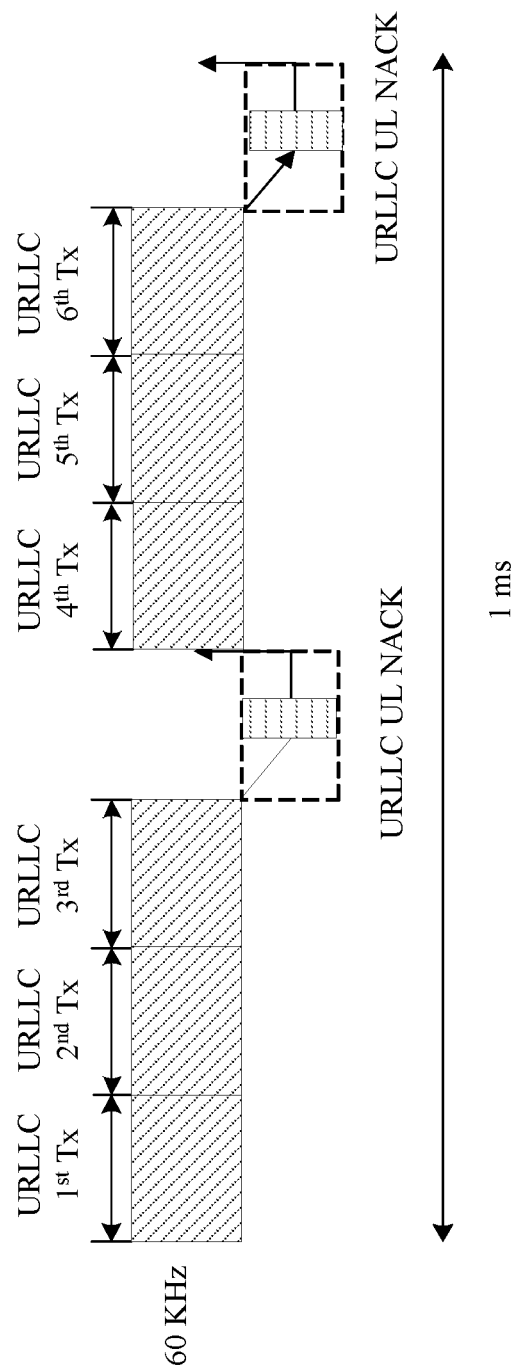
FIG. 4B is another schematic diagram of a repetition mode of data retransmitted this time in a retransmission method according to embodiments of this application.
Figure 4C:
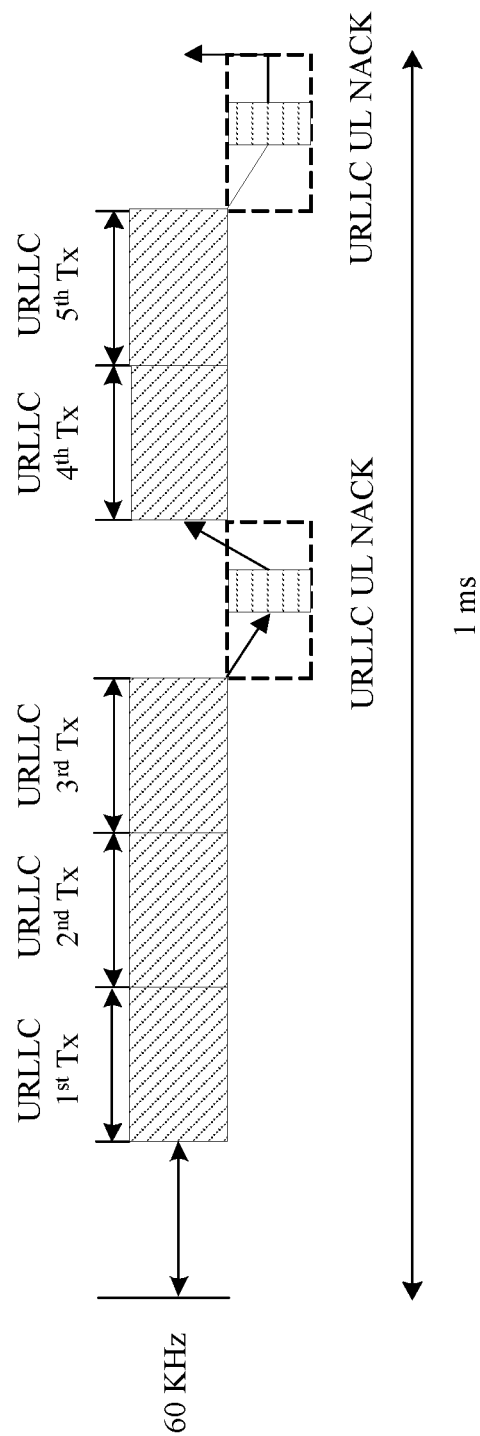
FIG. 4C is still another schematic diagram of a repetition mode of data retransmitted this time in a retransmission method according to embodiments of this application.

FIG. 4A is a schematic diagram of a repetition mode of data retransmitted this time in the retransmission method according to embodiments of this application. FIG. 4B is another schematic diagram of a repetition mode of data retransmitted this time in the retransmission method according to embodiments of this application. FIG. 4C is still another schematic diagram of a repetition mode of data retransmitted this time in the retransmission method according to embodiments of this application.

Referring to FIG. 4A, a subcarrier spacing is 60 kHZ. When each slot includes seven symbols, there are eight slots in total in a 1 ms time period. After the transmitting device transmits data to the receiving device in a slot, the receiving device transmits feedback information after the slot. For example, if the receiving device correctly receives data, an ACK is fed back; or if the receiving device does not correctly receive data, a NACK is fed back. After each slot for transmitting data, there needs to be a slot for receiving feedback information. Therefore, in the eight slots, the receiving device needs to provide a feedback at an interval of one slot. In addition, in a 1 ms time period, up to four times of transmission are supported. The four times of transmission are respectively URLLC $1^{st}$ TX, URLLC $2^{nd}$ TX, URLLC $3^{rd}$ TX, and URLLC $4^{th}$ TX (respectively shown by diagonals in the figure); and each feedback is a URLLC UL ACK (respectively shown by a vertical line in the figure).

Referring to FIG. 4B, after the transmitting device transmits data to the receiving device every time, the receiving device does not need to provide a feedback about each time of transmission. For example, the transmitting device retransmits same data to the receiving device for three consecutive times, where coding schemes used for retransmission at the three times are different. In this case, the receiving device needs to provide only one feedback about the retransmitted data in the three different coding schemes, for example, feedback an ACK or a NACK. If a NACK is fed back, the transmitting device may fully use a remaining transmission time to perform retransmission consecutively, as shown in FIG. 4B, where three times of transmission first performed are URLLC $1^{st}$ TX, URLLC $2^{nd}$ TX, and URLLC $3^{rd}$ TX respectively, and then the transmitting device receives a URLLC UL NACK transmitted by the receiving device. After the NACK is received, retransmission is performed for three consecutive times, which are URLLC $4^{th}$ TX, URLLC $5^{th}$ TX, and URLLC $6^{th}$ TX respectively (respectively shown by diagonals in the figure). Then, if the receiving device still fails to receive the data, the receiving device transmits a NACK. Correspondingly, the transmitting device receives the URLLC UL NACK (as shown by a vertical line in the figure) transmitted by the receiving device. In this process, the remaining transmission time is a remaining time after the three consecutive times of transmission, a latency in feeding back the NACK by the receiving device after decoding, and a latency in receiving the NACK by the transmitting device are deducted from the 1 ms latency.

Referring to FIG. 4C, different from FIG. 4B, in this embodiment, the transmitting device starts to perform transmission consecutively after waiting for a duration, such as a waiting latency in the figure, and transmits retransmitted data for three consecutive times, which are URLLC $1^{st}$ TX, URLLC $2^{nd}$ TX, and URLLC $3^{rd}$ TX (respectively shown by diagonals in the figure). The three pieces of retransmitted data are retransmitted data of same data, and coding schemes of the three pieces of retransmitted data are different. In this case, the receiving device needs to provide only one feedback about the retransmitted data in the three different coding schemes. If a NACK (shown by a vertical line in the figure) is fed back, the transmitting device performs retransmission consecutively within a remaining transmission time, for example, two consecutive times of retransmission, which are URLLC $4^{th}$ TX and URLLC $5^{th}$ TX (respectively shown by diagonals in the figure).

In the foregoing embodiment, the quantity of consecutive times of retransmission that the transmitting device can perform depends on a time of feeding back the feedback information by the receiving device. If the time of feeding back the feedback information by the receiving device is earlier, the transmitting device may support more times of retransmission.

In another example, when the repetition mode of the data retransmitted this time is determined, not only the third information but also the feedback information is considered. In this case, the transmitting device determines the repetition mode based on a tenth mapping relationship included in the third information; and the transmitting device transmits the data retransmitted this time to the receiving device based on the repetition mode, where the tenth mapping relationship is a mapping relationship between the repetition mode, the fourth information, and eighth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the eighth information is information indicating the repetition mode of the data retransmitted this time, in the feedback information.

In the foregoing embodiment, when the transmitting device is user equipment, and the receiving device is a base station, which retransmission mode is used in the transmission process may be preconfigured by the base station, for example, may be configured by using system information and/or higher layer signaling or indicated in downlink control information or uplink grant information during initial transmission scheduling, or is indicated to the transmitting device after being selected by the receiving device, for example, indicated in the ACK/NACK at each time of transmission and/or indicated in downlink control information and/or uplink grant information. When both the transmitting device and the receiving device are user equipment, the retransmission mode is obtained through negotiation by the transmitting device and the receiving device. When the transmitting device is a base station, but the receiving device is user equipment, the retransmission mode may be preconfigured by the base station or indicated to the transmitting device after being selected by the receiving device.

Specifically, different retransmission modes may be configured based on capabilities of the receiving device, or the like. When the receiving device transmits the feedback information after reception fails, the receiving device feeds back rich information based on the first information, for example, the start position or the length of the data retransmitted this time, to suggest the start position, the length, the puncturing rule, or the like of the data retransmitted this time to the transmitting device.

Figure 5:
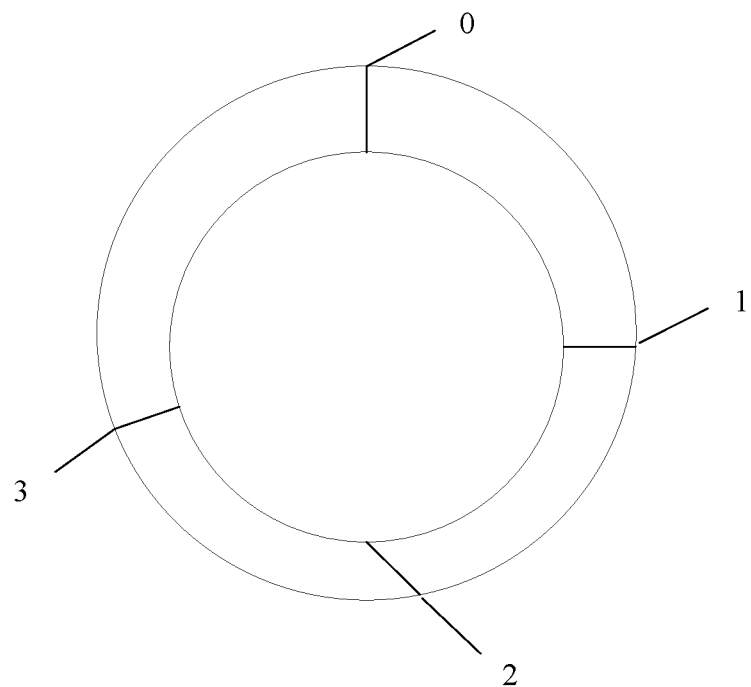
FIG. 5 is a schematic diagram of a process of a retransmission method according to embodiments of this application.

FIG. 5 is a schematic diagram of a process of the retransmission method according to embodiments of this application. Referring to FIG. 5, the cyclic buffer includes four pieces of retransmitted data, where start positions are 0, 1, 2, and 3 respectively. After initial transmission, the receiving device cannot perform correct reception, and retransmission may be required. The feedback information transmitted to the transmitting device, in other words, the NACK, carries start position information and length information of the data retransmitted this time, where the start position information indicates that the start position of the data retransmitted this time is 3, and the length information indicates that the length of the data retransmitted this time is 0.1. Therefore, based on the cyclic buffer, the transmitting device fetches, starting from the start position 3, the length of 0.1 as the data retransmitted this time.

When the transmitting device and the receiving device include a base station and user equipment, the base station may broadcast, by using system information or the like, a retransmission mode supported by the base station. When reporting a type and/or a capability, the user equipment may notify a retransmission mode supported by the user equipment to the base station. Alternatively, the base station may semi-statically configure, by using higher layer signaling or the like, a retransmission mode used by the user equipment, for example, configure different retransmission modes for uplink transmission and downlink transmission of the user equipment respectively, or configure a same retransmission mode for uplink transmission and downlink transmission of the user equipment. Alternatively, the base station may indicate, in scheduling information, a retransmission mode used by the user equipment at a time of transmission, where a retransmission mode used at each time of transmission may be the same or different.

Figure 6:
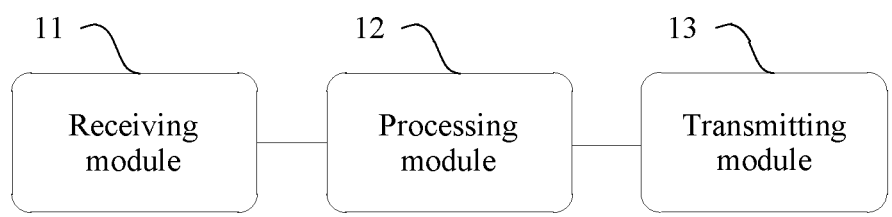
FIG. 6 is a schematic structural diagram of a transmitting device according to embodiments of this application.

FIG. 6 is a schematic structural diagram of a transmitting device according to embodiments of this application. The transmitting device provided by this embodiment may implement each step of the method applied to the transmitting device in this application. A specific implementation process is not described again herein. Specifically, the transmitting device provided by this embodiment includes:

a receiving module 11, configured to receive feedback information transmitted by a receiving device, where the feedback information is transmitted by the receiving device based on first information;

a processing module 12, configured to generate, based on second information and the feedback information, data retransmitted this time; and a transmitting module 13, configured to transmit, based on third information, the data retransmitted this time to the receiving device.

In an embodiment of this application, after receiving the feedback information transmitted by the receiving device based on the first information indicated by a retransmission mode, the transmitting device uses the second information indicated by the retransmission mode to generate the data retransmitted this time, and transmits the data to the receiving device based on the third information indicated by the retransmission mode. In this process, a plurality of retransmission modes are set, so that when different retransmission modes are used, the first information used for transmitting the feedback information, the second information used for generating the retransmitted data, or the third information used for transmitting the retransmitted data is different. Therefore, objectives of reducing HARQ overheads and ensuring transmission efficiency, reliability, and latency performance of a wireless communications system are achieved.

Optionally, in an embodiment of this application, the first information indicates at least one of the following information: a time-frequency resource occupied by the feedback information or a format of the feedback information, where the format of the feedback information includes at least one of a bit sequence length of the feedback information, a meaning of the feedback information, or a modulation and coding scheme corresponding to the feedback information; the second information indicates at least one of the following information: information about a start position or information about a length of the data retransmitted this time; and the third information indicates at least one of the following information: a time-frequency resource occupied by the data retransmitted this time, a modulation and coding scheme, a puncturing rule, or a repetition mode.

Optionally, in an embodiment of this application, the time-frequency resource occupied by the feedback information is determined by the receiving device based on a first mapping relationship included in the first information, where the first mapping relationship is a mapping relationship between the time-frequency resource occupied by the feedback information and fourth information, and the fourth information includes at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, or a slot for retransmission.

Optionally, in an embodiment of this application, the format of the feedback information is determined by the receiving device based on a second mapping relationship included in the first information, where the second mapping relationship is a mapping relationship between the format of the feedback information and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission.

Optionally, in an embodiment of this application, the processing module 12 is specifically configured to: when the feedback information indicates that previous retransmission fails, determine the start position based on a third mapping relationship included in the second information, where the third mapping relationship is a mapping relationship between the start position and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; and generate, based on the start position, the data retransmitted this time; or the processing module 12 is specifically configured to: when the feedback information indicates that previous retransmission fails, determine the start position based on a fourth mapping relationship included in the second information, where the fourth mapping relationship is a mapping relationship between the start position, the fourth information, and fifth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the fifth information is information indicating the start position in the feedback information; and generate, based on the start position, the data retransmitted this time.

Optionally, in an embodiment of this application, the processing module 12 is specifically configured to: when the feedback information indicates that previous retransmission fails, determine the length based on a fifth mapping relationship included in the second information, where the fifth mapping relationship is a mapping relationship between the length and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; and generate, based on the length, the data retransmitted this time; or the processing module 12 is specifically configured to: when the feedback information indicates that previous retransmission fails, determine the length of the retransmitted data based on a sixth mapping relationship included in the second information, where the sixth mapping relationship is a mapping relationship between the length, the fourth information, and sixth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the sixth information is information indicating the length in the feedback information; and generate, based on the length, the data retransmitted this time.

Optionally, in an embodiment of this application, the transmitting module 13 is specifically configured to determine, based on a seventh mapping relationship included in the third information, the time-frequency resource occupied by the data retransmitted this time; and transmit the data retransmitted this time to the receiving device by using the time-frequency resource occupied by the data retransmitted this time, where the seventh mapping relationship is a mapping relationship between the time-frequency resource occupied by the data retransmitted this time and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the transmitting module 13 is specifically configured to determine, based on an eighth mapping relationship included in the third information, the time-frequency resource occupied by the data retransmitted this time; and transmit the data retransmitted this time to the receiving device by using the time-frequency resource occupied by the data retransmitted this time, where the eighth mapping relationship is a mapping relationship between the time-frequency resource occupied by the data retransmitted this time, the fourth information, and seventh information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the seventh information is information indicating the time-frequency resource occupied by the data retransmitted this time, in the feedback information.

Optionally, in an embodiment of this application, the transmitting module 13 is specifically configured to determine the repetition mode based on a ninth mapping relationship included in the third information; and transmit the data retransmitted this time to the receiving device based on the repetition mode, where the ninth mapping relationship is a mapping relationship between the repetition mode and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the transmitting module 13 is specifically configured to determine the repetition mode based on a tenth mapping relationship included in the third information; and transmit the data retransmitted this time to the receiving device based on the repetition mode, where the tenth mapping relationship is a mapping relationship between the repetition mode, the fourth information, and eighth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the eighth information is information indicating the repetition mode of the data retransmitted this time, in the feedback information.

Optionally, in an embodiment of this application, at least one of the first information, the second information, and the third information is preconfigured; or at least one of the first information, the second information, and the third information is obtained through signaling interaction between the transmitting device and the receiving device; or at least one of the first information, the second information, and the third information is indicated by the receiving device to the transmitting device; or the transmitting device determines at least one of actual first information, actual second information, and actual third information, and indicates the at least one of the actual first information, the actual second information, and the actual third information to the receiving device.

Figure 7:
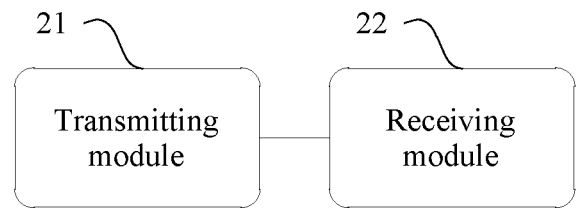
FIG. 7 is a schematic structural diagram of a receiving device according to embodiments of this application.

FIG. 7 is a schematic structural diagram of a receiving device according to embodiments of this application. The receiving device may implement each step of the method applied to the receiving device in this application. A specific implementation process is not described again herein. Specifically, the receiving device includes:

a transmitting module 21, configured to transmit feedback information to a transmitting device based on first information; and a receiving module 22, configured to receive data retransmitted this time, where the data retransmitted this time is transmitted by the transmitting device based on third information, where the data retransmitted this time is generated by the transmitting device based on second information and the feedback information.

In an embodiment of this application, after the feedback information transmitted based on the first information indicated by a retransmission mode is received, the second information indicated by the retransmission mode is used to generate the data retransmitted this time, and the data is transmitted to the receiving device based on the third information indicated by the retransmission mode. In this process, a plurality of retransmission modes are set, so that when different retransmission modes are used, the first information used for transmitting the feedback information, the second information used for generating the retransmitted data, or the third information used for transmitting the retransmitted data is different. Therefore, objectives of reducing HARQ overheads and ensuring transmission efficiency, reliability, and latency performance of a wireless communications system are achieved.

Optionally, in an embodiment of this application, the first information indicates at least one of the following information: a time-frequency resource occupied by the feedback information or a format of the feedback information, where the format of the feedback information includes at least one of a bit sequence length of the feedback information, a meaning of the feedback information, or a modulation and coding scheme corresponding to the feedback information; the second information indicates at least one of the following information: a start position or a length of the data retransmitted this time; and the third information indicates at least one of the following information: a time-frequency resource occupied by the data retransmitted this time, a modulation and coding scheme, a puncturing rule, or a repetition mode.

Optionally, in an embodiment of this application, the receiving module 22 is specifically configured to determine, based on a first mapping relationship included in the first information, the time-frequency resource occupied by the feedback information; and the transmitting module 21 is configured to transmit the feedback information to the transmitting device by using the time-frequency resource occupied by the feedback information, where the first mapping relationship is a mapping relationship between the time-frequency resource occupied by the feedback information and fourth information, and the fourth information includes at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, or a slot for retransmission.

Optionally, in an embodiment of this application, the receiving module 22 is specifically configured to determine the format of the feedback information based on a second mapping relationship included in the first information; and the transmitting module 21 is configured to transmit the feedback information to the transmitting device based on the format of the feedback information, where the second mapping relationship is a mapping relationship between the format of the feedback information and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission.

Optionally, in an embodiment of this application, the start position of the data retransmitted this time is determined by the transmitting device based on a third mapping relationship included in the second information, and the data retransmitted this time is generated by the transmitting device based on the start position and the feedback information, where the third mapping relationship is a mapping relationship between the start position and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; or the start position of the data retransmitted this time is determined by the transmitting device based on a fourth mapping relationship included in the second information, and the data retransmitted this time is generated by the transmitting device based on the start position and the feedback information, where the fourth mapping relationship is a mapping relationship between the start position, the fourth information, and fifth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the fifth information is information indicating the start position in the feedback information.

Optionally, in an embodiment of this application, the length of the data retransmitted this time is determined by the transmitting device based on a fifth mapping relationship included in the second information, and the data retransmitted this time is generated by the transmitting device based on the length and the feedback information, where the fifth mapping relationship is a mapping relationship between the length and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission; or the length of the data retransmitted this time is determined by the transmitting device based on a sixth mapping relationship included in the second information, and the data retransmitted this time is generated by the transmitting device based on the length and the feedback information, where the sixth mapping relationship is a mapping relationship between the length, the fourth information, and sixth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the sixth information is information indicating the length in the feedback information.

Optionally, in an embodiment of this application, the time-frequency resource occupied by the data retransmitted this time is determined by the transmitting device based on a seventh mapping relationship included in the third information, and the data retransmitted this time is transmitted by the transmitting device by using the time-frequency resource occupied by the retransmitted data, where the seventh mapping relationship is a mapping relationship between the time-frequency resource occupied by the retransmitted data and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the time-frequency resource occupied by the data retransmitted this time is determined by the transmitting device based on an eighth mapping relationship included in the third information, and the data retransmitted this time is transmitted by the transmitting device by using the time-frequency resource occupied by the retransmitted data, where the eighth mapping relationship is a mapping relationship between the time-frequency resource occupied by the data retransmitted this time, the fourth information, and seventh information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the seventh information is information indicating the time-frequency resource occupied by the data retransmitted this time, in the feedback information.

Optionally, in an embodiment of this application, the repetition mode of the data retransmitted this time is determined by the transmitting device based on a ninth mapping relationship included in the third information, and the data retransmitted this time is transmitted by the transmitting device based on the repetition mode, where the ninth mapping relationship is a mapping relationship between the repetition mode and the fourth information, and the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule; or the repetition mode of the data retransmitted this time is determined by the transmitting device based on a tenth mapping relationship included in the third information, and the data retransmitted this time is transmitted by the transmitting device based on the repetition mode, where the tenth mapping relationship is a mapping relationship between the repetition mode, the fourth information, and eighth information, the fourth information includes at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the eighth information is information indicating the repetition mode of the data retransmitted this time, in the feedback information.

Optionally, in an embodiment of this application, at least one of the first information, the second information, and the third information is preconfigured; or at least one of the first information, the second information, and the third information is obtained through signaling interaction between the transmitting device and the receiving device; or at least one of the first information, the second information, and the third information is indicated by the receiving device to the transmitting device; or the transmitting device determines at least one of actual first information, actual second information, and actual third information, and indicates the at least one of the actual first information, the actual second information, and the actual third information to the receiving device.

Figure 8:
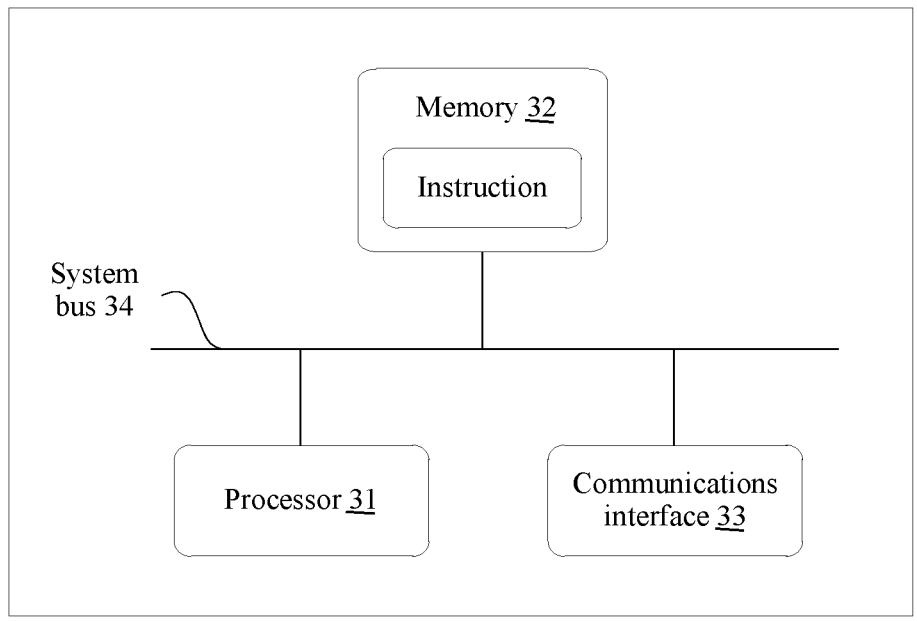
FIG. 8 is a schematic structural diagram of a transmitting device according to embodiments of this application.

FIG. 8 is a schematic structural diagram of a transmitting device according to embodiments of this application. The transmitting device provided by this embodiment of this application includes a processor 31, a memory 32, a communications interface 33, and a system bus 34. The memory 32 and the communications interface 33 are connected to and communicate with the processor 31 by using the system bus 34. The memory 32 is configured to store a computer-executable instruction. The communications interface 33 is configured to communicate with another device. The processor 31 is configured to run the computer-executable instruction, so that the transmitting device performs each step of the foregoing method applied to the transmitting device.

Figure 9:
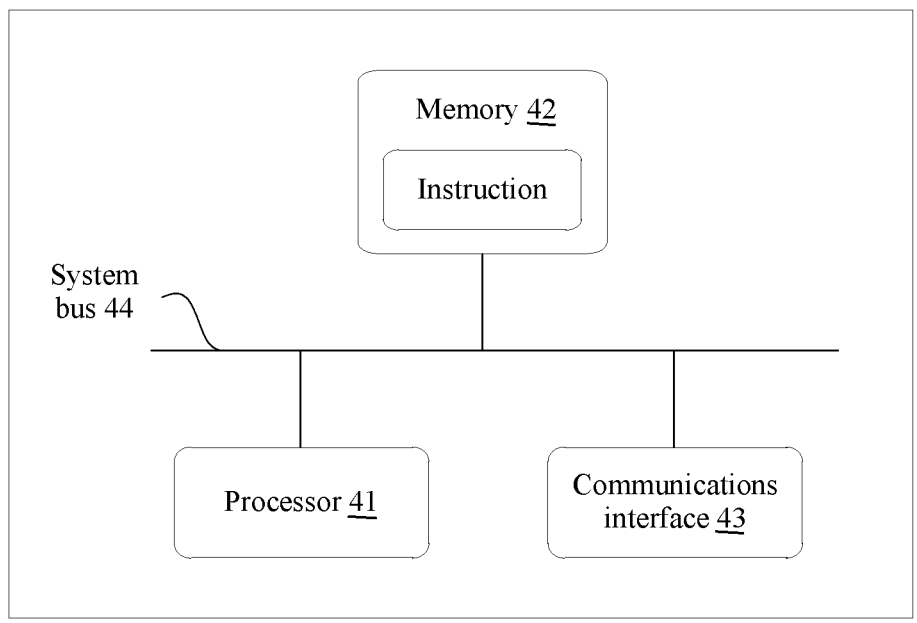
FIG. 9 is a schematic structural diagram of a receiving device according to embodiments of this application.

FIG. 9 is a schematic structural diagram of a receiving device according to embodiments of this application. The receiving device provided by this embodiment of this application includes a processor 41, a memory 42, a communications interface 43, and a system bus 44. The memory 42 and the communications interface 43 are connected to and communicate with the processor 41 by using the system bus 44. The memory 42 is configured to store a computer-executable instruction. The communications interface 43 is configured to communicate with another device. The processor 41 is configured to run the computer-executable instruction, so that the receiving device performs each step of the foregoing method applied to the receiving device.

What is claimed is:

1. A retransmission method, comprising:
receiving, by a transmitting device, feedback information transmitted by a receiving device, wherein the feedback information is transmitted by the receiving device based on first information indicated by a retransmission mode;
generating, by the transmitting device based on second information indicated by the retransmission mode and the feedback information, retransmitted data; and
transmitting, by the transmitting device based on third information indicated by the retransmission mode, the retransmitted data to the receiving device,
wherein the first information indicates a time-frequency resource occupied by the feedback information,
wherein the time-frequency resource occupied by the feedback information is determined by the receiving device based on a first mapping relationship comprised in the first information,
wherein the first mapping relationship is a mapping relationship between the time-frequency resource occupied by the feedback information and fourth information, and
wherein the fourth information comprises at least one of the following information:
a modulation and coding scheme for initial transmission,
a modulation and coding scheme for previous data retransmission,
a time-frequency resource for initial transmission,
a time-frequency resource for data retransmission,
a quantity of times of retransmission,
a slot for initial transmission, or
a slot for retransmission.

2. The method according to claim 1,
wherein the second information indicates at least one of the following information:
information about a start position, or
information about a length of the retransmitted data; and
wherein the third information indicates at least one of the following information:
a time-frequency resource occupied by the retransmitted data,
a modulation and coding scheme,
a puncturing rule, or
a repetition mode.

3. The method according to claim 2, wherein the generating, by the transmitting device based on second information and the feedback information, retransmitted data comprises:
in accordance with the feedback information indicating that a previous retransmission fails, determining, by the transmitting device, the start position based on a third mapping relationship comprised in the second information, wherein the third mapping relationship is a mapping relationship between the start position and the fourth information, and the fourth information comprises at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, or a slot for retransmission; and generating, by the transmitting device based on the start position, the retransmitted data; or
in accordance with the feedback information indicating that previous retransmission fails, determining, by the transmitting device, the start position based on a fourth mapping relationship comprised in the second information, wherein the fourth mapping relationship is a mapping relationship between the start position, the fourth information, and fifth information, the fourth information comprises at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the fifth information is information indicating the start position in the feedback information; and generating, by the transmitting device based on the start position, the retransmitted data.

4. The method according to claim 2, wherein the generating, by the transmitting device based on second information and the feedback information, retransmitted data comprises:
in accordance with the feedback information indicating that previous retransmission fails, determining, by the transmitting device, the length of the retransmitted data based on a fifth mapping relationship comprised in the second information, wherein the fifth mapping relationship is a mapping relationship between the length and the fourth information, and the fourth information comprises at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, or a slot for retransmission; and generating, by the transmitting device based on the length, the retransmitted data; or
in accordance with the feedback information indicating that previous retransmission fails, determining, by the transmitting device, the length of the retransmitted data based on a sixth mapping relationship comprised in the second information, wherein the sixth mapping relationship is a mapping relationship between the length, the fourth information, and sixth information, the fourth information comprises at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the sixth information is information indicating the length in the feedback information; and generating, by the transmitting device based on the length, the retransmitted data.

5. The method according to claim 2, wherein the transmitting, by the transmitting device based on third information, the retransmitted data to the receiving device comprises:
determining, by the transmitting device based on a seventh mapping relationship comprised in the third information, the time-frequency resource occupied by the retransmitted data; and transmitting, by the transmitting device, the retransmitted data to the receiving device by using the time-frequency resource occupied by the retransmitted data, wherein the seventh mapping relationship is a mapping relationship between the time-frequency resource occupied by the retransmitted data and the fourth information, and the fourth information comprises at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, a slot for retransmission, or the puncturing rule; or
determining, by the transmitting device based on an eighth mapping relationship comprised in the third information, the time-frequency resource occupied by the retransmitted data; and transmitting, by the transmitting device, the retransmitted data to the receiving device by using the time-frequency resource occupied by the retransmitted data, wherein the eighth mapping relationship is a mapping relationship between the time-frequency resource occupied by the retransmitted data, the fourth information, and seventh information, the fourth information comprises at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the seventh information is information indicating the time-frequency resource occupied by the retransmitted data, in the feedback information.

6. The method according to claim 2, wherein the transmitting, by the transmitting device based on the third information, the retransmitted data to the receiving device comprises:
determining, by the transmitting device, the repetition mode based on a ninth mapping relationship comprised in the third information; and transmitting, by the transmitting device, the retransmitted data to the receiving device based on the repetition mode, wherein the ninth mapping relationship is a mapping relationship between the repetition mode and the fourth information, and the fourth information comprises at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, a slot for retransmission, or the puncturing rule; or
determining, by the transmitting device, the repetition mode based on a tenth mapping relationship comprised in the third information; and transmitting, by the transmitting device, the retransmitted data to the receiving device based on the repetition mode, wherein the tenth mapping relationship is a mapping relationship between the repetition mode, the fourth information, and eighth information, the fourth information comprises at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the eighth information is information indicating the repetition mode of the retransmitted data, in the feedback information.

7. The method according to claim 1, wherein the first information indicates a format of the feedback information, wherein the format of the feedback information comprises at least one of:

a bit sequence length of the feedback information,
a meaning of the feedback information, or
a modulation and coding scheme corresponding to the feedback information;
wherein the format of the feedback information is determined by the receiving device based on a second mapping relationship comprised in the first information,
wherein the second mapping relationship is a mapping relationship between the format of the feedback information and the fourth information, and
wherein the fourth information comprises at least one of the following information:
the modulation and coding scheme for initial transmission,
the modulation and coding scheme for previous data retransmission,
the time-frequency resource for initial transmission,
the time-frequency resource for data retransmission,
a quantity of times of retransmission,
a slot for initial transmission, or
a slot for retransmission.

8. The method according to claim 1, wherein at least one of the first information, the second information, and the third information is preconfigured; or
at least one of the first information, the second information, and the third information is obtained through signaling interaction between the transmitting device and the receiving device; or
at least one of the first information, the second information, and the third information is indicated by the receiving device to the transmitting device; or
the transmitting device determines at least one of actual first information, actual second information, and actual third information, and indicates the at least one of the actual first information, the actual second information, and the actual third information to the receiving device.

9. A transmitting device, comprising:
a processor, and
an interface circuitry;
wherein the processor and the interface circuitry are coupled with each other;
wherein that the processor executes program instructions to control the transmitting device to perform a method comprising:
receiving, feedback information transmitted by a receiving device, wherein the feedback information is transmitted by the receiving device based on first information indicated by a retransmission mode;
generating, based on second information indicated by the retransmission mode and the feedback information, retransmitted data; and
transmitting, based on third information indicated by the retransmission mode, the retransmitted data to the receiving device,
wherein the first information indicates a time-frequency resource occupied by the feedback information,
wherein the time-frequency resource occupied by the feedback information is determined by the receiving device based on a first mapping relationship comprised in the first information,
wherein the first mapping relationship is a mapping relationship between the time-frequency resource occupied by the feedback information and fourth information, and
wherein the fourth information comprises at least one of the following information:
a modulation and coding scheme for initial transmission,
a modulation and coding scheme for previous data retransmission,
a time-frequency resource for initial transmission,
a time-frequency resource for data retransmission,
a quantity of times of retransmission, a slot for initial transmission, or
a slot for retransmission.

10. The transmitting device according to claim 9,
wherein the second information indicates at least one of the following information:
information about a start position, or
information about a length of the retransmitted data; and
wherein the third information indicates at least one of the following information:
a time-frequency resource occupied by the retransmitted data,
a modulation and coding scheme,
a puncturing rule, or
a repetition mode.

11. The transmitting device according to claim 10, wherein that generating, based on second information and the feedback information, retransmitted data comprises:
in accordance with the feedback information indicating that previous retransmission fails, determining the start position based on a third mapping relationship comprised in the second information, wherein the third mapping relationship is a mapping relationship between the start position and the fourth information, and the fourth information comprises at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, or a slot for retransmission; and generating, based on the start position, the retransmitted data; or
in accordance with the feedback information indicating that previous retransmission fails, determining the start position based on a fourth mapping relationship comprised in the second information, wherein the fourth mapping relationship is a mapping relationship between the start position, the fourth information, and fifth information, the fourth information comprises at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the fifth information is information indicating the start position in the feedback information; and generating, based on the start position, the retransmitted data.

12. The transmitting device according to claim 10, wherein that generating, based on second information and the feedback information, retransmitted data comprises:
in accordance with the feedback information indicating that previous retransmission fails, determining the length of the retransmitted data based on a fifth mapping relationship comprised in the second information, wherein the fifth mapping relationship is a mapping relationship between the length and the fourth information, and the fourth information comprises at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, or a slot for retransmission; and generating, based on the length, the retransmitted data; or in accordance with the feedback information indicating that previous retransmission fails, determining the length of the retransmitted data based on a sixth mapping relationship comprised in the second information, wherein the sixth mapping relationship is a mapping relationship between the length, the fourth information, and sixth information, the fourth information comprises at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, or the slot for retransmission, and the sixth information is information indicating the length in the feedback information; and generating, based on the length, the retransmitted data.

13. The transmitting device according to claim 10, wherein that transmitting, based on third information, the retransmitted data to the receiving device comprises:

determining, based on a seventh mapping relationship comprised in the third information, the time-frequency resource occupied by the retransmitted data; and transmitting the retransmitted data to the receiving device by using the time-frequency resource occupied by the retransmitted data, wherein the seventh mapping relationship is a mapping relationship between the time-frequency resource occupied by the retransmitted data and the fourth information, and the fourth information comprises at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, a slot for retransmission, or the puncturing rule; or determining, based on an eighth mapping relationship comprised in the third information, the time-frequency resource occupied by the retransmitted data; and transmitting the retransmitted data to the receiving device by using the time-frequency resource occupied by the retransmitted data, wherein the eighth mapping relationship is a mapping relationship between the time-frequency resource occupied by the retransmitted data, the fourth information, and seventh information, the fourth information comprises at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, a slot for retransmission, or the puncturing rule, and the seventh information is information indicating the time-frequency resource occupied by the retransmitted data, in the feedback information.

14. The transmitting device according to claim 10, wherein that transmitting, based on third information, the retransmitted data to the receiving device comprises:

determining the repetition mode based on a ninth mapping relationship comprised in the third information; and transmitting the retransmitted data to the receiving device based on the repetition mode, wherein the ninth mapping relationship is a mapping relationship between the repetition mode and the fourth information, and the fourth information comprises at least one of the following information: a modulation and coding scheme for initial transmission, a modulation and coding scheme for previous data retransmission, a time-frequency resource for initial transmission, a time-frequency resource for data retransmission, a quantity of times of retransmission, a slot for initial transmission, a slot for retransmission, or the puncturing rule; or determining the repetition mode based on a tenth mapping relationship comprised in the third information; and transmitting the retransmitted data to the receiving device based on the repetition mode, wherein the tenth mapping relationship is a mapping relationship between the repetition mode, the fourth information, and eighth information, the fourth information comprises at least one of the following information: the modulation and coding scheme for initial transmission, the modulation and coding scheme for previous data retransmission, the time-frequency resource for initial transmission, the time-frequency resource for data retransmission, the quantity of times of retransmission, the slot for initial transmission, the slot for retransmission, or the puncturing rule, and the eighth information is information indicating the repetition mode of the retransmitted data, in the feedback information.

15. The transmitting device according to claim 9, wherein the first information indicates a format of the feedback information, wherein the format of the feedback information comprises at least one of:

a bit sequence length of the feedback information,
a meaning of the feedback information, or
a modulation and coding scheme corresponding to the feedback information;

wherein the format of the feedback information is determined by the receiving device based on a second mapping relationship comprised in the first information, wherein the second mapping relationship is a mapping relationship between the format of the feedback information and the fourth information, and wherein the fourth information comprises at least one of the following information:

a modulation and coding scheme for initial transmission,
a modulation and coding scheme for previous data retransmission,
a time-frequency resource for initial transmission,
a time-frequency resource for data retransmission,
a quantity of times of retransmission,
a slot for initial transmission, or
a slot for retransmission.

16. The transmitting device according to claim 9, wherein at least one of the first information, the second information, and the third information is preconfigured; or at least one of the first information, the second information, and the third information is obtained through signaling interaction between the transmitting device and the receiving device; or at least one of the first information, the second information, and the third information is indicated by the receiving device to the transmitting device; or the transmitting device determines at least one of actual first information, actual second information, and actual third information, and indicates the at least one of the actual first information, the actual second information, and the actual third information to the receiving device.

* * * * *